United States Patent [19]
Donovan

[11] Patent Number: 4,765,537
[45] Date of Patent: Aug. 23, 1988

[54] RADIATOR VENT VALVE

[75] Inventor: John R. Donovan, Indianapolis, Ind.

[73] Assignee: ITT Corporation, New York, N.Y.

[21] Appl. No.: 477,429

[22] Filed: Mar. 21, 1983

[51] Int. Cl.$^4$ ............................................. F16T 1/08
[52] U.S. Cl. ................................... 236/62; 137/202
[58] Field of Search ........................ 137/202; 236/62

[56] References Cited

U.S. PATENT DOCUMENTS

| | | | |
|---|---|---|---|
| 1,490,940 | 4/1924 | Russell | 236/62 |
| 1,912,867 | 6/1933 | Thibodeau | 236/62 |
| 2,188,441 | 1/1940 | Magee | 137/202 X |
| 2,334,047 | 11/1943 | Tuttle | 137/202 X |
| 4,325,398 | 4/1982 | Green | 137/202 X |

Primary Examiner—Alan Cohan
Attorney, Agent, or Firm—Menotti J. Lombardi

[57] ABSTRACT

An improved radiator vent valve includes a freely movable float in a cylindrical casing. The float is formed from a solid sphere of polypropylene. The float normally rests on a bimetallic thermostatic strip which has its ends folded under. The thermostatic strip rests on the bottom wall of the casing and is held in place by gravity, i.e., no fasteners or mechanical connection is made to the thermostatic strip.

8 Claims, 1 Drawing Sheet

4,765,537

RADIATOR VENT VALVE

BACKGROUND OF THE INVENTION

This invention pertains to air vent valves, in general, and to radiator vent valves of the type used in one-pipe steam heating systems, in particular.

Each radiator, unit heater, or convector and each steam main end in a one-pipe heating system must be equipped with an air vent valve to allow proper steam circulation.

Air vent valves used in one-pipe steam heating systems are required to meet several exacting criteria. For example, the valve must be capable of permitting the passage of air from the heating unit, but at the same time must close off when steam or water reaches it. In addition, as soon as the water recedes, or after the temperature inside the vent valve has fallen, it must open once again to permit the passage of air. Radiator vent valves must be capable of operating continuously during a heating season, therefore, the materials used must be corrosion resistant and preferably of relatively low cost.

Prior radiator vent valves such as those of U.S. Pat. Nos. 2,167,433 and 2,338,495 have been equipped with a brass float, filled and sealed with a liquid that expands under heating to thereby close off a port when steam reaches the valve. At the same time the float is buoyant in water and therefore shuts off the port on water rise.

The foregoing type of construction of radiator vent valves has been effective and has provided numerous advantages. However, because of required continuous operation during a heating season and the soaring cost of energy, the aforementioned construction has proved to be unreliable and therefore is replaced yearly with a consequent increase in cost.

Other prior vent valves such as that of U.S. Pat. Nos. 2,084,256 and 2,144,097 utilize a float filled with an expansible-contractable temperature responsive fluid as in the aforementioned patents and further include a bellows filled with a temperature responsive fluid which is responsive to lower temperatures. Such vent valves utilize cylindrical shaped floats and require the use of guide pins attached to the float to prevent joining the float.

U.S. Pat. No. 379,889 shows a vent valve utilizing a cylindrical float and a wire coil. The float is guided within the coil and rises to close a vent port when water enters the valve. The wire coil expands at steam temperature to close the vent port. The wire coil and the float operate independently of each other.

U.S. Pat. No. 312,042 shows a vent valve having a hollow spheroidal float of rubber which floats in the presence of water and expands under the heat of steam. This arrangement does not appear to be quickly responsive to steam and the life of a rubber float is relatively short.

U.S. Pat. No. 3,260,458 uses a ball valve and sleeve arrangement actuated by a bimetallic strip to close a vent under the heat of steam. However, this arrangement does not prevent spitting of water.

SUMMARY OF THE INVENTION

In accordance with the principles of the invention, a radiator vent valve includes a valve body or shell containing a float and a thermostatic strip, the thermostatic strip being placed between the float and the bottom of the shell such that the float rests on the thermostatic strip.

Further in accordance with the invention, the thermostatic strip is formed such that it will maintain a predetermined orientation with the shell without fastening.

Still further in accordance with the invention, the bottom of the valve body includes a pedestal upon which the thermostatic strip rests to prevent condensate which may accumulate in the valve from affecting operation of the float.

Further in accordance with the invention, the valve includes a first chamber containing the float and thermostatic element and a second chamber. A vent passage is provided between the first and second chambers and a vent port is provided in the second chamber. The second chamber serves to trap water which might otherwise spit from the valve and the vent port is positioned relative to the connection to the radiator such that steam or water leaking from the valve is directed in a preferred direction.

Still further in accordance with the invention, a solid float is used. The float is formed of a material having a specific gravity less than that of water. In the embodiment described, the float is a solid sphere of polypropylene.

BRIEF DESCRIPTION OF THE DRAWINGS

The invention may be better understood from a reading of the following detailed description of a preferred embodiment of the invention in conjunction with the drawings in which.

DETAILED DESCRIPTION

Figure 1:
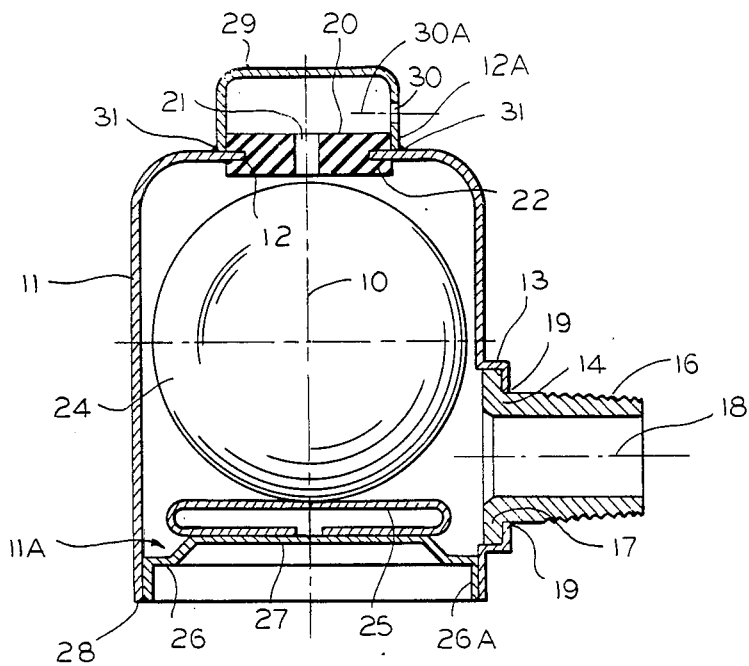
FIG. 1 is a cross-sectional view of a radiator vent valve.
Figure 2:
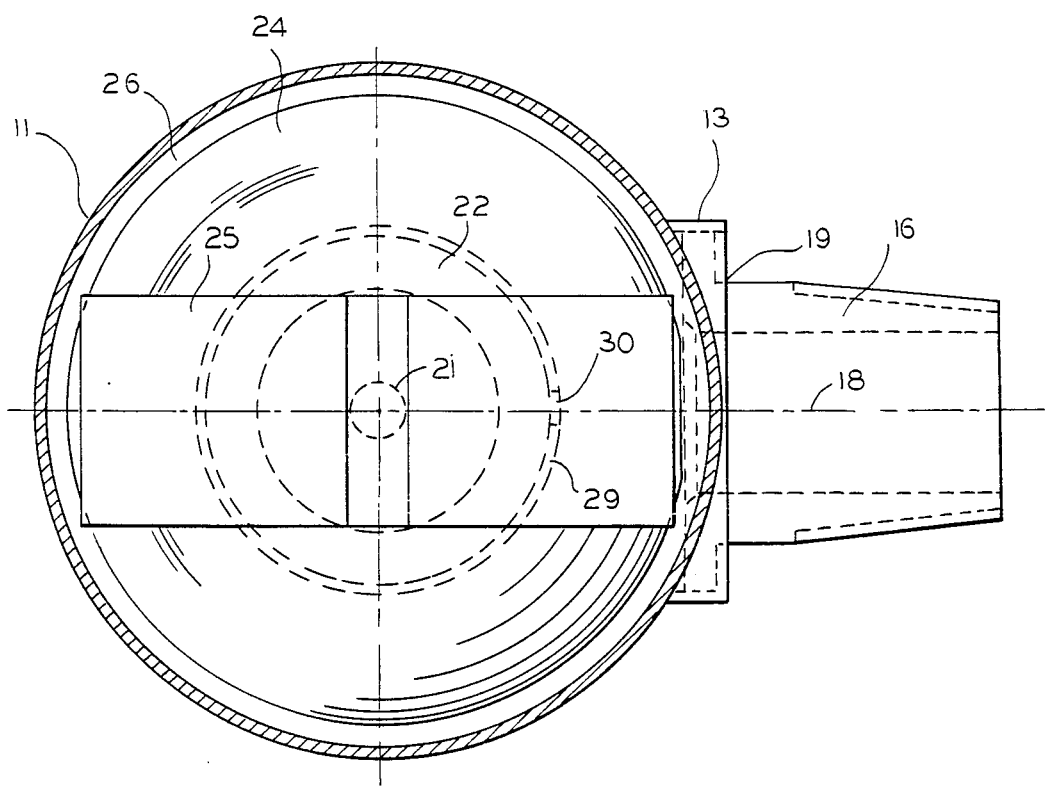
FIG. 2 is a bottom view of the valve of FIG. 1 with the bottom cap removed.

The radiator vent valve includes a generally cylindrical shell 11 having an open bottom 11a which is closed by a bottom cap 26. The top of the shell 11 includes an aperture 12 positioned concentric with the longitudinal axis 10 of the shell.

Shell 11 includes an extrusion 13 drawn perpendicular to the shell wall. A hole 14 is pierced in extrusion 13. A nipple 16 is contained in the extrusion 13 by means of a flange 17 carried on nipple 16. The nipple is positioned such that its longitudinal axis 18 is perpendicular relative to the shell wall. The nipple 16 is secured in position by a weld 19.

A grommet 20 consisting of EPDM and having a central aperture 21 is snugly fit into aperture 12. The grommet 20 includes a circumferential groove 12A which engages a flange portion 22 of shell 11 surrounding aperture 21.

A protective cap 29 is positioned above the grommet 20 and is fastened to the shell 11 by a circumferential weld 31. The cap 29 includes an aperture 30 having an axis 30A which is positioned parallel to and in the same direction as nipple 16.

The bottom cap 26 includes a circumferential flange 26A which engages the interior wall of shell 11. The bottom cap 26 is held in place by a seam weld 28. The bottom cap 26 is formed with a central raised or pedestal portion 27.

A rectangular bimetallic strip 25 is formed by bending both ends of the strip so that they are under the center portion of the strip. The bimetallic or thermostatic strip 25 is placed on pedestal portion 27 of the bottom wall.

A spherical float 24 of solid polypropylene is contained in the shell above the bimetallic strip 25. The float has a specific gravity less than that of water and is thus bouyant in water.

The thermostatic strip 25 has its length and width selected such that when the radiator vent valve is assembled, the strip will be captured between the pedestal 27 and the float 24.

It should, however, be noted that the bimetallic strip 25 is not secured or fastened to either the float 28 or the pedestal 27. During assembly, the bimetallic strip 25 is merely placed on the pedestal.

The nipple 16 is positioned with its longitudinal axis 18 below the middle of the float 24 when the float is in the position shown. With the nipple so positioned, fluid entering the vent valve will be directed to the thermostatic strip 25.

In operation, the nipple 16 is coupled to the radiator on steam main of a steam heating system. Air from the main enters the radiator vent valve and escapes therefrom via aperture 21 of grommet 20 to aperture 30 in cap 29. As steam reaches the radiator vent valve, it heats the bimetallic strip 25 causing it to deform and urge the float 24 upward into engagement with grommet 20 hereby closing aperure 21. preventing the escape of steam from the valve and entrance of air into the valve. As long as steam remains in the radiator or steam main 1, the bimetallic strip will remain in its deformed state and the float 24 will be urged against grommet 20. After the steam is shut off, the bimetallic strip begins cooling down and returns to its original shape and the float drops down to the open position shown in FIG. 1.

Should the radiator or steam main become filled with water, the water will enter the vent valve raising float 24 against the grommet 20 thereby closing aperture 21 and preventing the escape of water. As the water drains from the main, it likewise drains from the vent valve lowering the float 24 and again opening aperture 21.

By providing the cap 29, any water or steam that might spit from the valve is redirected in the direction of aperture 30 which in turn is oriented parallel and in the same direction as the nipple 16. Thus any water or steam that may leak from the valve if the valve fails, will be directed back against the hot surface of the radiator thereby reducing the possibility of burns to individuals or damage. Additionally, water the might otherwise spit from the valve will, to some extent, be caught in the cap and drain back into the valve shell when the float 24 is not closing aperture 21.

Further by providing the pedestal 27 upon which the bimetallic strip 25 rests, the thermostatic strip is kept out of any condensate that might build up in the bottom of the valve.

To prolong the life of the valve, the shell 11, cap 29, bottom 26 and the nipple 16 are all formed of stainless steel in the illustrative embodiment.

What is claimed is:

1. An air vent valve comprising a cylindrical housing having a wall on one end;
    vent means on said one wall, said wall includes an aperture, and said vent means includes a resilient grommet captured in said aperture and having a vent hole therethrough;
    a bottom cap closing the other end of said housing;
    an inlet port in the sidewall of said housing for providing fluid communication with a steam heating system;
    a float within said housing, said float being freely movable within said housing, said float is a sphere of solid material having a specific gravity less than the specific gravity of water;
    said inlet port is positioned below the center of said float;
    a bimetallic thermostatic strip contained in said housing between said float and said bottom cap and being freely movable within said housing between said float and said bottom cap, said bimetallic thermostatic strip being responsive to fluid temperatures in said housing to raise said float into sealing engagement with said vent hole when said fluid temperature is at or greater than a predetermined operating temperature.

2. An air vent valve in accordance with claim 1, wherein said material is polypropylene.

3. An air vent valve in accordance with claim 1 comprising a cup shaped cap over said grommet and fastened to said housing, said cup shaped cap having a vent aperture.

4. An air vent valve in accordance with claim 3, wherein said vent aperture of said cap is positioned relative to said vent hole such that the axes of said vent aperture and said vent hole are at right angles to each other.

5. An air vent valve in accordance with claim 1, wherein said bottom cap comprises a pedestal portion, said thermostatic strip being supported on said pedestal.

6. An air vent valve in accordance with claim 5, wherein said thermostatic strip comprises a center portion, a first end portion, and a second end portion, said first and second end portions each being spaced apart from and parallel to said other portion.

7. An air vent valve in accordance with claim 1, wherein said cylindrical housing and said bottom cap comprise stainless steel.

8. An air vent valve in accordance with claim 1, wherein said cylindrical housing comprises an aperture in the bottom portion of its sidewall, said aperture being surrounded by an integrally formed circular flange, said flange having a first portion perpendicular to and outwardly extending from said sidewall, and a second portion extending radially inward from said first portion;
    said inlet port comprising a nipple inserted in said aperture, said nipple having a shoulder adapted to engage said circular flange.

* * * * *